No. 756,069. PATENTED MAR. 29, 1904.
A. P. SMITH, Jr.
BALL BEARING SPACER.
APPLICATION FILED JUNE 5, 1902.
NO MODEL.
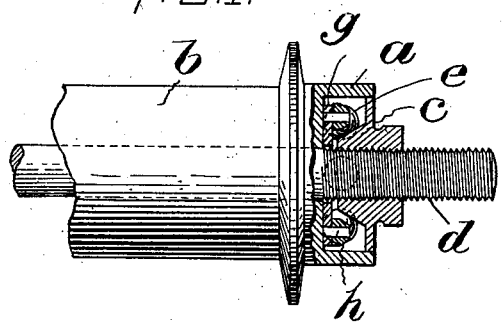
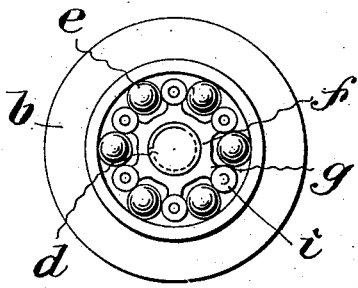
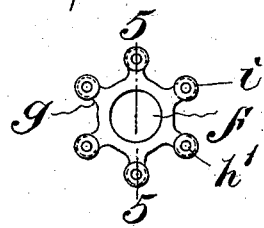
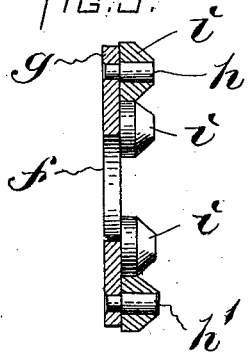
WITNESSES:
INVENTOR.

No. 756,069. Patented March 29, 1904.

UNITED STATES PATENT OFFICE.

ALBA P. SMITH, JR., OF BROCKTON, MASSACHUSETTS.

BALL-BEARING SPACER.

SPECIFICATION forming part of Letters Patent No. 756,069, dated March 29, 1904.

Application filed June 5, 1902. Serial No. 110,277. (No model.)

*To all whom it may concern:*

Be it known that I, ALBA P. SMITH, Jr., of Brockton, in the county of Plymouth and State of Massachusetts, have invented certain new and useful Improvements in Ball-Bearing Spacers, of which the following is a specification.

The object of this invention is the production of a simple, inexpensive, and durable device for spacing or separating balls or roller elements of an antifriction-bearing. As is well known, the chief object of such devices is to separate the balls or roller elements from each other, so that they will not contact when passing around the bearing or raceway and produce friction between their oppositely-moving adjacent surfaces.

Various devices having the above-named object in view have been produced, and among them are structures comprising a cage which supports a plurality of axles at both ends of the latter, rollers being supported on said axles and formed to be interposed between the balls or roller elements of the bearing. Such devices are objectionable, however, because of the expense of their production, the difficulty of assembling their parts and of cleaning after assembling, and the friction due to the construction of the cages. I overcome all of these objections by the construction of a spider or annular support having studs projecting from one side thereof, the outer ends of the studs being unsupported and rollers mounted on said studs and adapted to project between and properly separate or space the antifriction-balls or roller elements, as hereinafter more fully set forth.

My invention consists in the construction and combination of parts, substantially as hereinafter described and claimed.

Of the drawings, Figure 1 represents a detail elevation of a portion of an antifriction-bearing to which my invention in its preferred embodiment has been applied, a portion being broken out to illustrate other parts in section. Fig. 2 represents an end view from the right of Fig. 1, the cone-bearing having been removed. Figs. 3 and 4 represent, respectively, side and front elevations of the spider-frame or annular support and the spacing-rollers carried thereby. Fig. 5 represents a section on line 5 5 of Fig. 4 drawn to an enlarged scale.

The same reference characters indicate the same parts in all the figures.

The exact shape and relative proportions of the parts of the bearing itself may be variously modified from the construction illustrated. I have shown the invention, however, as applied to a ball-bearing comprising a ball race or cup $a$, which may be a part of a wheel-hub, which is somewhat conventionally illustrated at $b$. In this form of bearing the inner cylindrical wall of the ball-race $a$ sustains the greater pressure against the balls $e$, which are confined in an annular series between it and the cone $c$, which is shown as adjustable in an ordinary manner upon the threaded portion of an axle $d$. To properly separate or space the balls $e$, I form a ring $f$, having radiating arms $g$, constituting a spider or annular support, the said arms having rigidly secured thereto short studs $h$, said studs projecting from one side only of the arms and being unsupported at their outer ends. Upon these studs I place small rollers $i$, which are preferably cone-shaped or tapered to such a degree that their tapered portions will be substantially parallel with or equal to the inclination of the cone $c$. In other words, the construction is such that while the cone is tapered in one direction the rollers are tapered in the opposite direction, so that the surfaces of the rollers $i$ nearest to the surface of the cone $c$ will be substantially parallel. This arrangement avoids binding of the balls $e$ when the cone $c$ is set up to compensate for wear. The rollers $i$ may be removably mounted upon the studs $h$, or the latter may be slightly headed, as indicated at $h'$ in Fig. 5, to retain the rollers upon the studs.

It will readily be seen that the matter of assembling the rollers $i$ upon the spider and the studs is a very simple one as compared with that of assembling the parts which constitute a cage-separator such as hereinbefore referred to. The construction is also relatively simple and inexpensive, and the parts of the spacer or separator may be more readily cleaned, and when in position in a bearing less friction is produced than results from the use of a cage-separator.

I do not limit myself to the particular form of bearing, irrespective of the spacer, shown in Fig. 1, although I prefer said bearing for the reason that it provides for but two points of heavy pressure against the antifriction-balls—namely, the inner cylindrical wall of the cup $a$ and the tapered surface of the bearing-cone $c$.

I claim—

In a ball-bearing, the combination with a ball race or cup, and a bearing-cone, of antifriction-balls in the space between said cup and cone, and a spacer comprising an annular support having studs projecting from one side thereof, between the said balls, and conical rollers mounted on said studs, the inclination of the rollers being opposite to that of the bearing-cone, and substantially equal to the latter in degree.

In testimony whereof I have affixed my signature in presence of two witnesses.

ALBA P. SMITH, JR.

Witnesses:
E. A. PACKARD,
A. W. HARRISON.